US011959792B2

(12) United States Patent
Gorenflo et al.

(10) Patent No.: US 11,959,792 B2
(45) Date of Patent: Apr. 16, 2024

(54) METHOD FOR DETERMINING THE FILL LEVEL OF A FILLING MATERIAL IN A CONTAINER

(71) Applicant: Endress+Hauser SE+Co. KG, Maulburg (DE)

(72) Inventors: Stefan Gorenflo, Hausen (DE); Alexey Malinovskiy, Maulburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 212 days.

(21) Appl. No.: 16/755,070

(22) PCT Filed: Sep. 11, 2018

(86) PCT No.: PCT/EP2018/074485
§ 371 (c)(1),
(2) Date: Apr. 9, 2020

(87) PCT Pub. No.: WO2019/072473
PCT Pub. Date: Apr. 18, 2019

(65) Prior Publication Data
US 2021/0190573 A1  Jun. 24, 2021

(30) Foreign Application Priority Data
Oct. 10, 2017  (DE) ............... 10 2017 123 529.9

(51) Int. Cl.
G01F 23/296    (2022.01)
G01F 23/284    (2006.01)
(Continued)

(52) U.S. Cl.
CPC ........ G01F 23/2962 (2013.01); G01F 23/284 (2013.01); G01S 7/292 (2013.01);
(Continued)

(58) Field of Classification Search
CPC .... G01F 23/2962; G01F 23/284; G01F 23/28; G01S 7/292; G01S 7/354; G01S 7/527; G01S 13/88; G01S 15/88
See application file for complete search history.

(56) References Cited

U.S. PATENT DOCUMENTS 4,596,144 A * 6/1986 Panton ............... G01F 23/2962
                                                          73/620
6,806,824 B2 * 10/2004 Kornle .................. G01S 13/103
                                                          342/135

(Continued)

FOREIGN PATENT DOCUMENTS

CN    101592514 A    12/2009
CN    103542911 A     1/2014
(Continued)

OTHER PUBLICATIONS

"Transducer and Measurement Technology", Oct. 30, 2014, Wentao Huang, pp. 270-271, 1-8.

Primary Examiner — Timothy A Brainard
Assistant Examiner — Ismaaeel A. Siddiquee
(74) Attorney, Agent, or Firm — Mark A. Logan; Endress+Hauser (USA) Holding, Inc.

(57) ABSTRACT

The present disclosure relates to a method for safe and exact ascertaining of fill level of a fill substance located in a container by means of an ultrasonic, or radar-based, fill level measuring device. In such case, the method is distinguished by the feature that the evaluation curve created based on the reflected received signal is differently greatly smoothed as a function of measured distance. To achieve this, the evaluation curve can be specially filtered, depending on the application. In this way, noise fractions and disturbance echoes can be efficiently suppressed, without unnecessarily limiting the accuracy of the fill level measurement.

5 Claims, 2 Drawing Sheets

(51) Int. Cl.
*G01F 23/2962* (2022.01)
*G01S 7/292* (2006.01)
*G01S 7/35* (2006.01)
*G01S 7/527* (2006.01)
*G01S 13/88* (2006.01)
*G01S 15/88* (2006.01)

(52) U.S. Cl.
CPC ............. *G01S 7/354* (2013.01); *G01S 7/527* (2013.01); *G01S 13/88* (2013.01); *G01S 15/88* (2013.01)

(56) References Cited

U.S. PATENT DOCUMENTS

| | | | |
|---|---|---|---|
| 2009/0235736 A1* | 9/2009 | Spanke | G01F 23/284 73/290 V |
| 2010/0162811 A1* | 7/2010 | Malinovskiy | G01F 23/284 73/290 V |
| 2016/0153822 A1* | 6/2016 | Gorenflo | G01S 15/88 73/290 V |
| 2017/0059691 A1* | 3/2017 | Fischer | G01F 23/284 |
| 2018/0372526 A1* | 12/2018 | Welle | G01F 23/284 |
| 2019/0101430 A1* | 4/2019 | Blomberg | G01S 7/006 |

FOREIGN PATENT DOCUMENTS

| | | |
|---|---|---|
| CN | 105556332 A | 5/2016 |
| DE | 4218303 C1 | 3/1994 |
| DE | 102004055551 A1 | 5/2006 |
| DE | 102012107146 A1 | 2/2014 |
| DE | 102013107847 A1 | 1/2015 |
| DE | 102014119589 A1 | 6/2016 |
| DE | 102015109463 A1 | 12/2016 |
| DE | 112006002310 T5 | 5/2019 |
| WO | 2004036155 A1 | 4/2004 |
| WO | 2015010814 A1 | 1/2015 |

* cited by examiner

METHOD FOR DETERMINING THE FILL LEVEL OF A FILLING MATERIAL IN A CONTAINER

CROSS-REFERENCE TO RELATED APPLICATIONS

The present application is related to and claims the priority benefit of German Patent Application No. 10 2017 123 529.9, filed on Oct. 10, 2017 and International Patent Application No. PCT/EP2018/074485, filed on Sep. 11, 2018, the entire contents of which are incorporated herein by reference.

TECHNICAL FIELD

The invention relates to a method for safe and exact ascertaining of the fill level of a fill substance located in a container by means of an ultrasonic, or radar-based, fill level measuring device.

BACKGROUND

In process automation technology, field devices are often applied, which serve for registering or for influencing process variables. Applied for registering process variables are sensors, which are used, for example, in fill level measuring devices, flowmeters, pressure- and temperature measuring devices, pH-redox potential measuring devices, conductivity measuring devices, or comparable devices. These register the corresponding process variables, such as fill level, flow, pressure, temperature, pH value, redox potential and conductivity. Such field device types are produced and sold by the firm, Endress+Hauser, in a wide variety of forms.

For fill level measurement of fill substances in containers, contactless measuring methods are preferred, since they are robust and low-maintenance. In such case, the terminology, "container", includes within the scope of the invention also non-closed containers, such as, for example, vats, lakes or oceans or flowing bodies of water. A further advantage of contactless measuring methods is that they are able to measure fill level virtually continuously. In the field of continuous fill level measurement, consequently, predominantly ultrasonic, or radar-based, measuring methods are applied (in the context of the invention, the terminology, "ultrasound" or "ultrasonic", refers to sound waves in a frequency range between 14 kHz and 1 GHz, while the terminology, "radar", refers to signals, or electromagnetic waves, having frequencies between 0.03 GHz and 300 GHz).

An established measuring principle, in such case, is the pulse travel time measuring principle. In such case, ultrasonic, or microwave, pulses are cyclically transmitted in the direction of the fill substance and the travel time until the receipt of the corresponding echo pulses measured. Based on this measuring principle, fill level measuring devices can be implemented with comparatively simple circuits. A radar-based, fill level measuring device, which works according to the pulse travel time method, is described, for example, in disclosure document DE 10 2012 104 858 A1. The ultrasonically based version is shown in, among others, the patent, EP 1480021 B1.

To the extent that a more complex circuit technology can be tolerated, the FMCW ("Frequency Modulated Continuous Wave") measuring principle provides another option for radar-based fill level measurement. A typical construction of FMCW-based fill level measuring devices is shown, by way of example, in disclosure document DE 10 2013 108 490 A1.

The FMCW-radar based distance measuring method rests on transmitting a continuous microwave signal having a modulated frequency. In such case, the frequency of the signal lies in a fixed frequency band containing a standardized center frequency. Characteristic for FMCW is that the transmitted frequency is not constant, but rather changes periodically within a defined frequency band. The time rate of change is, in such case, according to standard, linear and comprises a sawtooth, or triangle, shape. A sinusoidal change can, in principle, however, also be used. In contrast with the pulse travel time method, the distance, or the fill level, is determined in the FMCW method based on the instantaneous frequency difference between the currently received signal and the signal transmitted at the moment of receipt.

In the case of each of these measuring principles (ultrasound, pulse radar, and FMCW), a corresponding evaluation curve is created for ascertaining the fill level based on the received signal. In the case of application of ultrasound, the evaluation curve corresponds basically directly to the time amplitude curve of the received signal. In the case of the pulse radar-based method, due to the high pulse frequency, the evaluation curve is, in contrast, created by undersampling the received signal. In this way, the evaluation curve forms a time stretched version of the raw, received signal. In the case of implementing the FMCW method, the evaluation curve is created by mixing the transmitted signal with the received signal. In all cases, however, the evaluation curve reflects the amplitude of the received signal as a function of distance.

Fill level is determined from the evaluation curve, for example, as a result of detection and located placement of a local maximum. In order to be able to detect the appropriate maximum without there being any doubt as to the correctness of the identification, it is known to smooth the evaluation curve by means of a suitable filtering method, such as average value-, maximum value- or low-pass filtering, in order then to be able to determine the fill level based on the smoothed evaluation curve. In such case, a slight smoothing offers the advantage that maxima can be locally better resolved. In this way, the fill level can be more exactly determined. This is limited by a stronger smoothing, however, a stronger smoothing sinks the error-, or disturbance susceptibility of the fill level measurement. Such is especially advantageous when the fill substance, whose fill level is to be determined, has a very rough, or uneven, fill substance surface, so that the received signal is quite noisy. Above all, in the case of wavy or non-liquid fill substances such as granular materials, such is observed, wherein the correct fill level measurement in the latter case can additionally be made more difficult, when a bulk good forms a conical upper surface.

SUMMARY

An object of the invention, therefore, is to assure also in the case of difficult measuring conditions an exact and safe fill level measurement.

The invention achieves this object by a method for ascertaining fill level of a fill substance located in a container by means of a corresponding fill level measuring device, wherein the method comprises method steps as follows:

transmitting a transmitted, or sent, signal in the direction of the fill substance, receiving a received signal dependent on measured distance, creating an evaluation curve based at least on the received signal, smoothing the evaluation curve by means of at least one filtering method, and determining the fill level based on the smoothed evaluation curve.

According to the invention, the method is distinguished by differently greatly smoothing the evaluation curve as a function of measured distance. Thus, the fill level L can, in the most varied of applications, be determined, on the one hand, safely, and, on the other hand, in spite of this, very exactly. In such case, the method cannot only be applied such that the transmitted signal is transmitted in the form of an ultrasonic signal, but, also, such that the transmitted signal is transmitted in the form of a radar signal, especially a radar signal according to the FMCW- or pulse travel time methods.

For smoothing the evaluation curve, applied as filtering method can be, for example, a low-pass filtering, an, especially moving, average value filtering and/or an, especially moving, maximum value filtering. Accordingly, the terminology, "filtering", or "smoothing", in the context of the invention expressly does not mean the complete masking of individual portions of the evaluation curve.

The changing of the smoothing over the measured distance according to the invention can be set in different ways: for the case, in which as filtering method an average value filtering and/or a maximum value filtering are/is applied, the average value filter and/or the maximum value filter can be designed, for example, with a window width, which changes as a function of measured distance. For this, the window width can be changed linearly or non-linearly, especially exponentially and/or logarithmically, with the measured distance. Alternatively or supplementally, it is possible to set the window width to be constant in at least two different portions of the measured distance with mutually differing widths. In this connection, the window width is defined as that number of adjoining measurement points of the evaluation curve, from each of which an average value and/or a maximum value is determined. This definition can correspondingly also be transferred to the length of the segment of the measured distance, over which this number of adjoining measurement points extends.

Besides variants, which change the smoothing over the measured distance by means of the window width, it is also possible to implement in at least one portion of the measured distance a filtering method differing from an adjoining portion, in order to achieve in the individual portions different smoothings over the measured distance.

Independently of whether different filtering methods are applied in different portions, or independently of which type (linear, exponential, etc.) is used for the strength of the filtering in the different filtering methods, it is advantageous for practical purposes that the measured distance is divided into a near region, a middle region and a far region, wherein the smoothing in the near region and in the far region is set lower compared with the middle region. For, exactly in the two outer regions, it frequently occurs that the evaluation curve is marked by parasitic multi-echoes, container floor echoes or device internal echoes.

For executing the method according to one of the above mentioned embodiments, a corresponding fill level measuring device has at least the following components:

a transmitting unit (in the case of radar especially with frequencies above 70 GHz, a semiconductor based, primary radiator; in the case of ultrasound, e.g. a corresponding circuit having a piezo oscillator), which is designed to transmit the transmitted signal as a function of the implemented measuring principle in the form of an ultrasonic, or radar, wave, a receiving unit, such as, for example, a horn antenna or a resonator structure, which is embodied to receive the corresponding, received signal, and an evaluation unit (for example, in the form of a microcontroller or an FPGA), which is designed, based at least on the received signal, to create the evaluation curve, to smooth the evaluation curve differently as a function of measured distance, and, based on the smoothed evaluation curve, to determine the fill level.

BRIEF DESCRIPTION OF THE DRAWINGS

The invention will now be explained based on the appended drawing, the figures of which show as follows.

DETAILED DESCRIPTION

Figure 1:
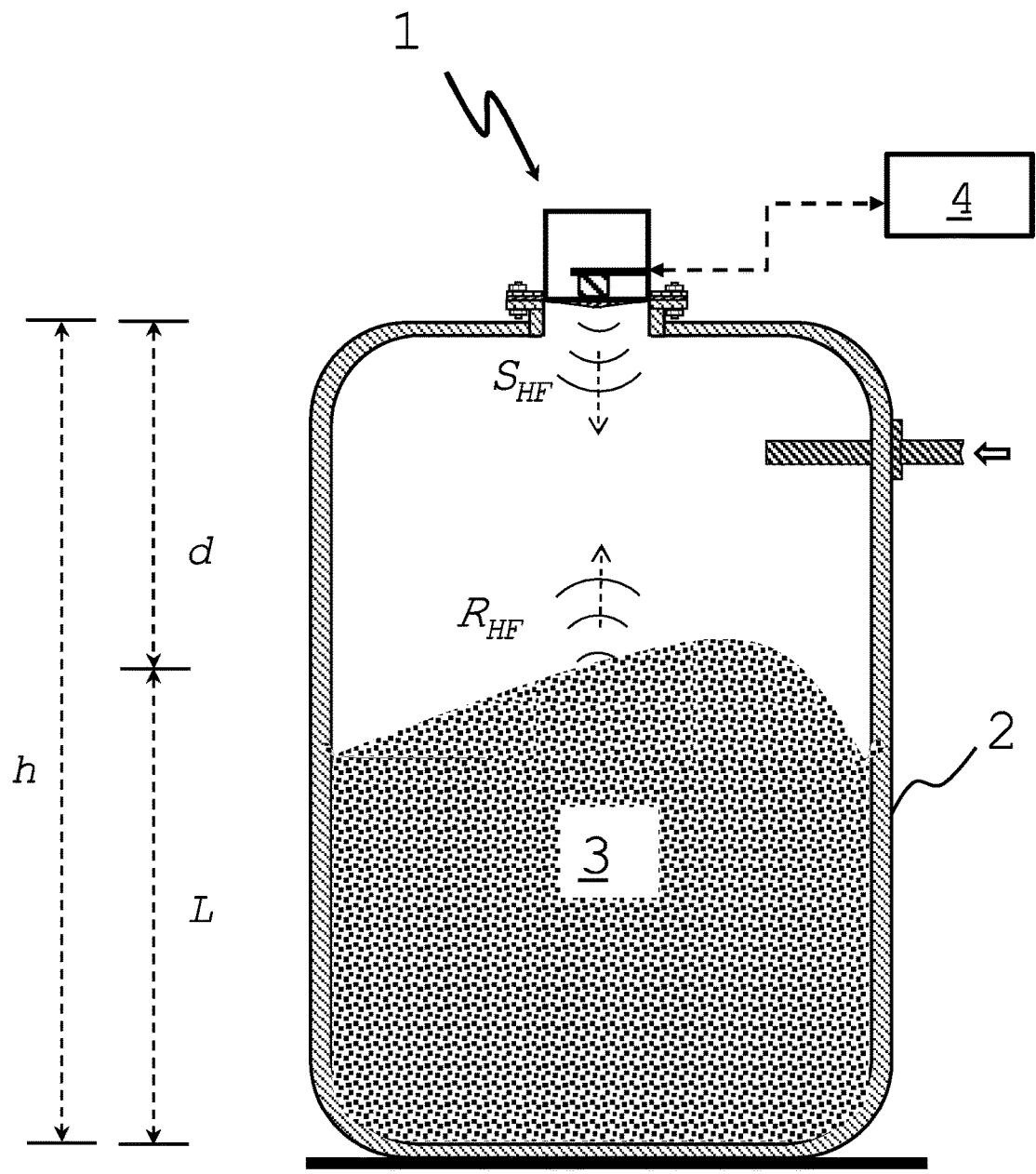
FIG. 1 shows a typical arrangement of a fill level measuring device.

For providing a general understanding of the invention, FIG. 1 shows a typical arrangement of an ultrasonic, or radar-based, fill level measuring device 1 on a container 2. Located in the container 2 is a fill substance 3, whose fill level L is to be determined by the fill level measuring device 1. In this regard, the fill level measuring device 1 is placed on the container 2 at a known installed height h above the container floor. In such case, the container 2 can, depending on application, be more than 100 m tall. Independently of the implemented measuring principle (ultrasound, pulse radar, FMCW), the fill level measuring device 1 includes as basic functional blocks:

a transmitting unit (for ultrasound, for example, a correspondingly operated piezo element; in the case of radar above 70 GHz, for example, a semiconductor-based, primary radiator), which is designed to transmit the sent, or transmitted, signal $S_{HF}$, a receiving unit for receiving the corresponding, received signal $R_{HF}$, and an evaluation unit, which is designed based on the received signal $R_{HF}$ to create and to smooth an evaluation curve, and based on that to determine the fill level L.

As a rule, fill level measuring device 1 is connected via a bus system, for instance, a "PROFIBUS", "HART" or "wireless HART" bus system, to a superordinate unit 4, for example, a process control system. In this way, on the one hand, information concerning the operating state of the fill level measuring device 1 can be communicated. Also information concerning fill level L can be transmitted, in order, in given cases, to control flows incoming to the container 2.

As evident from FIG. 1, the fill level measuring device 1 is so arranged on the container 2 that it transmits radar- or ultrasonically based, transmitted signals $S_{HF}$ in the direction of the surface of the fill substance 3. After reflection on the fill substance surface, the fill level measuring device 1 receives the reflected received signals $R_{HF}$ after a travel time t. In such case, the travel time t depends on the measured distance d, i.e. the distance h-L to the fill substance surface.

Figure 2:
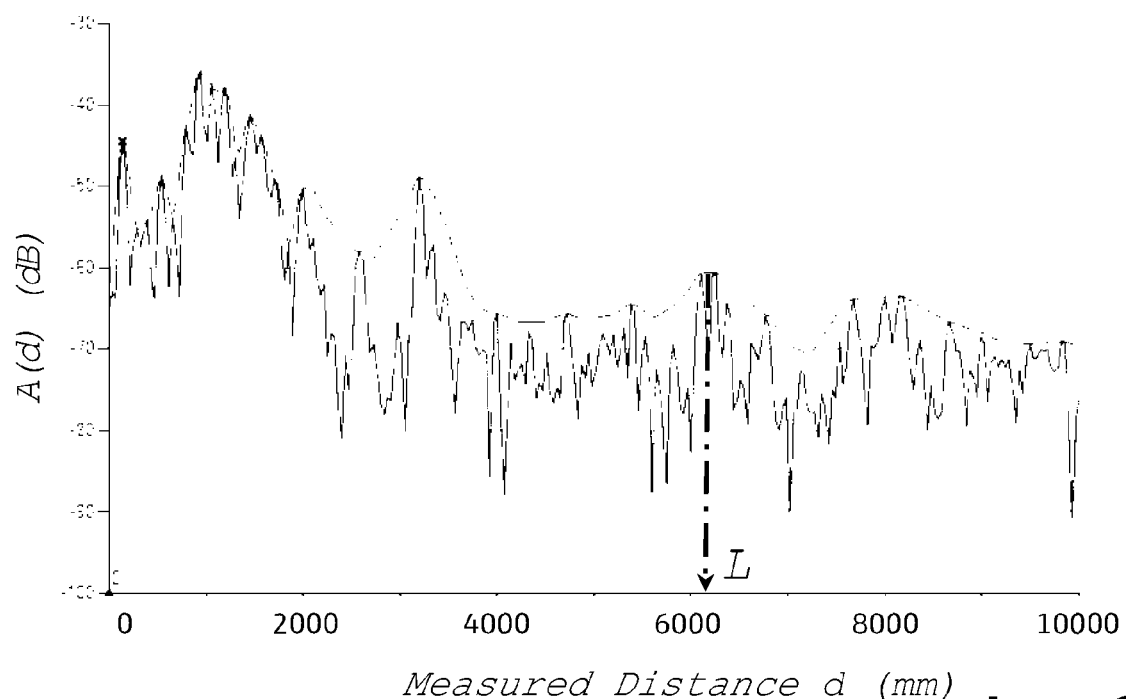
FIG. 2 shows an unsmoothed evaluation curve, as well as an evaluation curve smoothed by maximum value filtering.

For ascertaining the fill level L, the received signal $R_{HF}$ is registered in the form of an evaluation curve A(d). To the extent that the fill level measuring device 1 works based on ultrasound, the evaluation curve A(d) corresponds directly to the amplitude curve of the received signal $R_{HF}$ as a function of time (and, thus, as a function of the measured distance d). In the case of the pulse radar principle, the evaluation curve A(d) is, due to the high pulse frequency of the fill level measuring device 1, as a rule, created by undersampling the received signal $R_{HF}$. To the extent that the FMCW method is implemented in the fill level measuring device 1, the evaluation curve is created by mixing the transmitted signal $S_{HF}$ with the received signal $R_{HF}$. As shown in FIG. 2, the end result is that the evaluation curve A(d) provides the amplitude of the received signal as a function of measured distance, independently of the implemented measuring principle.

FIG. 1 shows schematically that the fill substance 3 is present in the form of a bulk good with a corresponding bulk-good cone. Accordingly, the corresponding evaluation curve A(d) shown in FIG. 2 is quite noisy. From the unfiltered evaluation curve A(d) it is, consequently, under these conditions not possible with sufficient safety correctly to figure out that amplitude maximum of the evaluation curve A(d), which was brought about by reflection of the transmitted signal $S_{HF}$ on the fill substance surface. For this reason, a filter-based smoothing of the evaluation curve A(d) is, as a rule, required for determining the fill level L. FIG. 2 shows, thus, supplementally, the evaluation curve A(d) smoothed per maximum value filtering and following average value formation. In comparison with a low-pass filtering, this offers the advantage that no loss, or no lessening, of amplitude is effected thereby.

As can be seen in FIG. 2, there results from the maximum value filtering a curve, which roughly follows the local maxima of the unfiltered evaluation curve A(d). In such case, the more the filtering (which means, in such case, the greater the window width, over which the maximum values are averaged), the greater small local maxima are masked out.

FIG. 2 shows, moreover, that, based on the smoothed evaluation curve A(d), the fill level L can be associated with a local maximum. A very highly accurate determining of the fill level value L is, however, not possible in such case, due to the greatly smoothed maximum. According to the invention, it is, consequently, provided that the evaluation curve A(d) is smoothed differently as a function of measured distance, thus, with different filtering strengths. For this, there are, such as shown in FIG. 3, various possibilities for putting this into practice.

A first possibility for measured distance-dependent smoothing is to divide the measured distance into different portions I, II, III and to set in each of the portions I, II, II, in each case, a constant filtering strength, wherein the filtering strength differs from that of the adjoining portion I, II, III. This potential type of implementation is shown in curve (a) of FIG. 3. Alternatively or supplementally, it is also an option so to set the filtering that the filtering strength continuously changes, at least in one of the portions I, II, III. In this connection, curve (b) of FIG. 3 shows a linear change of the filtering strength. As shown by curve (c), however, also any other type of continuous change, such as logarithmic, exponential, etc., can be implemented.

Figure 3:
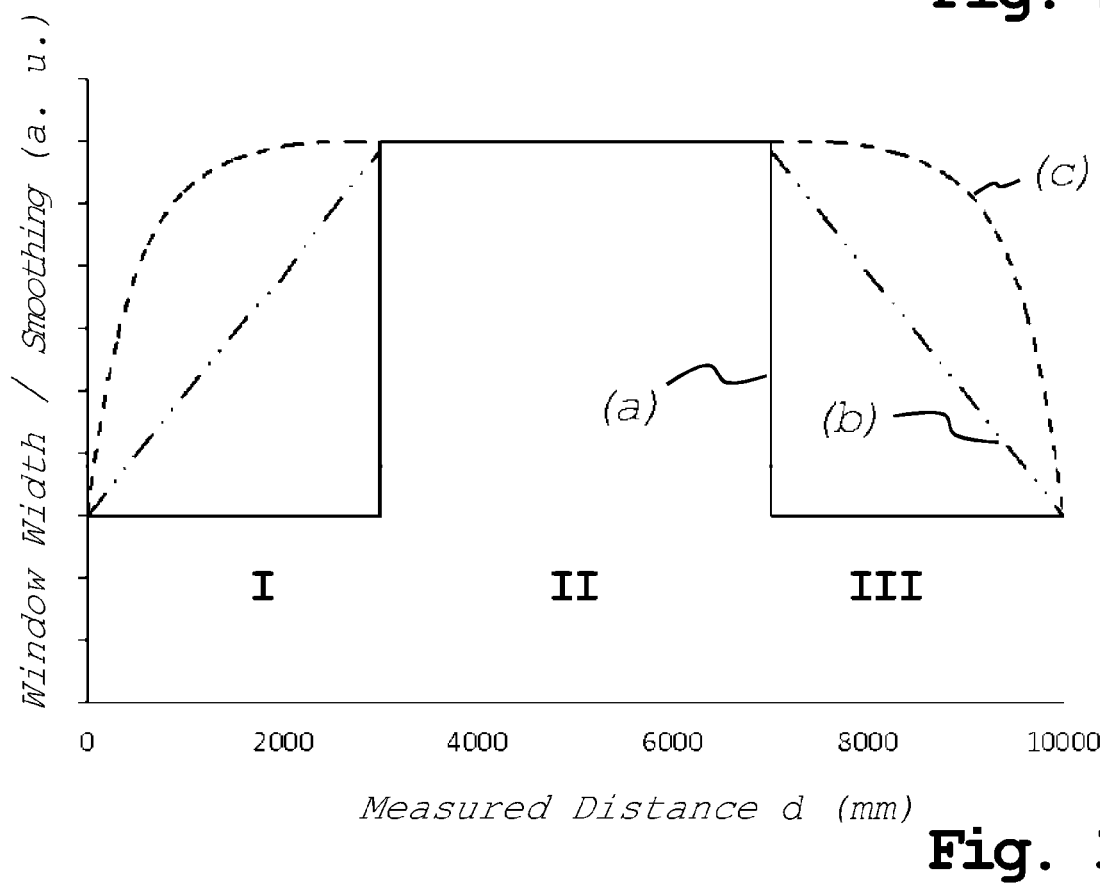
FIG. 3 shows different variants for smoothing the evaluation curve as a function of measured distance.

In the case of all the curves (a, b, c) shown in FIG. 3, the smoothing strengths in the near region I and in the far region III (in each case, with reference to the fill level measuring device 1) are lower compared with the middle region II of the measured distance d. This strategy of weakening the smoothing in the near region I and in the far region III (and, thus, strengthening the smoothing in the middle region II) is especially suitable for determining the fill level L according to the invention in a safe and yet exact manner: Especially in the near region I and in the far region III, the received signal $R_{HF}$ can be disturbed by parasitic multi-echoes, container floor echoes or device internal echoes.

Besides changing the filtering strength, i.e. the strength of the smoothing, another variant for implementing the invention provides that mutually differing filter types are used in different portions I, II, III of the measured distance. With referenced to FIG. 3, this means, for example, that the evaluation curve A(d) is smoothed in the middle region II by means of a low-pass filtering, while in the other portions I, III a maximum value filtering is implemented. In such case, the strength of the smoothing in the case of maximum value- or average value filtering is increased by increasing the window width. In the case of low-pass filtering, the filtering strength is correspondingly set by the attenuation, or damping, factor of the lowpass filter.

The invention claimed is:

1. A method for ascertaining fill level of a fill substance located in a container using a fill level measuring device, the method comprising:
    transmitting a transmitted signal in a direction of the fill substance;
    receiving a received signal that is dependent on a measured distance;
    creating an evaluation curve based at least on the received signal;
    dividing the measured distance into a near region, a middle region, and a far region;
    smoothing the evaluation curve using at least one filtering method,
        wherein the at least one filtering method is a low-pass filtering and a damping factor of the low pass filter increases in the near region as a function of the measured distance, remains constant in the middle region, and decreases in the far region as a function of the measured distance, or
        wherein the at least one filtering method is the low-pass filtering and the damping factor of the low pass filter is constant in the near region, is constant in the middle region, is constant in the far region, and is greater in the middle region than in the near region and in the far region, or
        wherein the at least one filtering method is a moving average value filtering and a window width of the moving average value filter increases in the near region as a function of the measured distance, is constant in the middle region, and decreases in the far region as a function of the measured distance, or
        wherein the at least one filtering method is the moving average value filtering and the window width of the moving average value filter is constant in the near region, is constant in the middle region, is constant in the far region, and is greater in the middle region than in the near region and in the far region, or
        wherein the at least one filtering method is a moving maximum value filtering and a window width of the moving maximum value filter increases in the near region as a function of the measured distance, is constant in the middle region, and decreases in the far region as a function of the measured distance, or wherein the at least one filtering method is the moving maximum value filtering and the window width of the moving maximum value filter is constant in the near region, is constant in the middle region, is constant in the far region, and is greater in the middle region than in the near region and in the far region; and determining the fill level based on the smoothed evaluation curve.

2. The method as claimed in claim 1,
wherein the transmitted signal is an ultrasonic signal.

3. The method as claimed in claim 1,
wherein the transmitted signal is a radar signal transmitted according to the Frequency Modulated Continuous Wave (FMCW) method or according to the pulse travel time method.

4. The method as claimed in claim 1,
wherein in at least one portion of the measured distance, a filtering method is implemented which differs from a filtering method in an adjoining portion.

5. A fill level measuring device, comprising:

a transmitting unit designed to transmit a transmitted signal;

a receiving unit embodied to receive a received signal that is dependent on a measured distance; and an evaluation unit designed to:
- create an evaluation curve based at least the received signal;
- divide the measured distance into a near region, a middle region, and a far region;
- smooth the evaluation curve using at least one filtering method,
  - wherein the at least one filtering method is a low-pass filtering and a damping factor of the low pass filter increases in the near region as a function of the measured distance, remains constant in the middle region, and decreases in the far region as a function of the measured distance, or
  - wherein the at least one filtering method is the low-pass filtering and the damping factor of the low pass filter is constant in the near region, is constant in the middle region, is constant in the far region, and is greater in the middle region than in the near region and in the far region, or
  - wherein the at least one filtering method is a moving average value filtering and a window width of the moving average value filter increases in the near region as a function of the measured distance, is constant in the middle region, and decreases in the far region as a function of the measured distance, or
  - wherein the at least one filtering method is the moving average value filtering and the window width of the moving average value filter is constant in the near region, is constant in the middle region, is constant in the far region, and is greater in the middle region than in the near region and in the far region, or
  - wherein the at least one filtering method is a moving maximum value filtering and a window width of the moving maximum value filter increases in the near region as a function of the measured distance, is constant in the middle region, and decreases in the far region as a function of the measured distance, or
  - wherein the at least one filtering method is the moving maximum value filtering and the window width of the moving maximum value filter is constant in the near region, is constant in the middle region, is constant in the far region, and is greater in the middle region than in the near region and in the far region; and determine a fill level based on the smoothed evaluation curve.

* * * * *